United States Patent
Marumoto et al.

(10) Patent No.: US 9,863,664 B2
(45) Date of Patent: Jan. 9, 2018

(54) SOLAR COLLECTOR FOR SOLAR HEAT BOILER, AND TOWER-TYPE SOLAR HEAT BOILER EQUIPPED WITH SAME

(71) Applicant: Mitsubishi Hitachi Power Systems, Ltd., Yokohama-shi, Kanagawa (JP)

(72) Inventors: Takahiro Marumoto, Kure (JP); Tetsuo Shikata, Tokyo (JP)

(73) Assignee: Mitsubishi Hitachi Power Systems, Ltd., Yokohama-shi (JP)

( * ) Notice: Subject to any disclaimer, the term of this patent is extended or adjusted under 35 U.S.C. 154(b) by 366 days.

(21) Appl. No.: 14/418,258

(22) PCT Filed: Jul. 30, 2013

(86) PCT No.: PCT/JP2013/070611
§ 371 (c)(1),
(2) Date: Jan. 29, 2015

(87) PCT Pub. No.: WO2014/021320
PCT Pub. Date: Feb. 6, 2014

(65) Prior Publication Data
US 2015/0192327 A1    Jul. 9, 2015

(30) Foreign Application Priority Data
Jul. 30, 2012   (JP) .................. 2012-168481

(51) Int. Cl.
*F24J 2/24*    (2006.01)
*F24J 2/10*    (2006.01)
(Continued)

(52) U.S. Cl.
CPC .............. *F24J 2/24* (2013.01); *F22B 1/006* (2013.01); *F22G 1/06* (2013.01); *F22G 3/00* (2013.01);
(Continued)

(58) Field of Classification Search
CPC . Y02E 10/40; F22G 3/00; F22G 3/007; F22G 1/06; F22B 1/006
See application file for complete search history.

(56) References Cited

U.S. PATENT DOCUMENTS

| 4,136,675 A | * | 1/1979 | Karasick ................. F24J 2/202 |
| | | | 126/621 |
| 5,431,149 A | * | 7/1995 | Fossum .................... F24J 2/265 |
| | | | 126/659 |

(Continued)

FOREIGN PATENT DOCUMENTS

| EP | 0 106 688 A2 | 4/1984 |
| EP | 0 106 688 A3 | 4/1984 |
| JP | 4-219470 A | 8/1992 |

OTHER PUBLICATIONS

International Search Report (PCT/ISA/210) dated Oct. 22, 2013 with English translation (four pages).
(Continued)

Primary Examiner — David J Laux
(74) Attorney, Agent, or Firm — Crowell & Moring LLP (57) ABSTRACT

A deviation between an inlet-outlet temperature difference of a first superheater part and an inlet-outlet temperature difference of each of second superheater parts can be reduced so that a difference in thermal expansion between the first superheater part and the second superheater part can be reduced. It is therefore possible to avoid damage on heat transfer pipes. A solar collector for a solar heat boiler is provided with: cylindrical headers (1,3,5) which are connected to opposite end portions of heat transfer pipes; and a solar heat collection portion including the heat transfer pipes and membrane bars fixing the heat transfer pipes to one another; wherein: the cylindrical headers include an inlet header (1) into which a fluid to be heated flows, an intermediate header (3) which is disposed in a position opposed
(Continued)

to the inlet header (1) with interposition of the heat transfer pipes, and two outlet headers (5,5) which are provided to extend on opposite end sides of the inlet header and through which the fluid from the intermediate header can be discharged to the outside; and the solar heat collection portion includes a first superheating portion (2) which has a group of the heat transfer pipes connected between the inlet header (1) and the intermediate header (3) so as to form a center region of the solar heat collection portion, and second superheating portions (4,4) which have groups of the heat transfer pipes connected between the intermediate header (3) and the two outlet headers (5) so as to be formed on opposite sides of the first superheating portion (2) respectively.

5 Claims, 5 Drawing Sheets (51) Int. Cl.
| | | |
|---|---|---|
| *F24J 2/38* | (2014.01) | |
| *F22G 3/00* | (2006.01) | |
| *F22G 1/06* | (2006.01) | |
| *F24J 2/26* | (2006.01) | |
| *F24J 2/07* | (2006.01) | |
| *F24J 2/46* | (2006.01) | |
| *F22B 1/00* | (2006.01) | |

(52) U.S. Cl.
CPC . *F24J 2/07* (2013.01); *F24J 2/10* (2013.01); *F24J 2/265* (2013.01); *F24J 2/38* (2013.01); *F24J 2/4636* (2013.01); *F24J 2/4647* (2013.01); *Y02E 10/41* (2013.01); *Y02E 10/44* (2013.01)

(56) References Cited

U.S. PATENT DOCUMENTS 5,575,276 A * 11/1996 Fossum ............... F24D 17/0021
126/588
2008/0236572 A1* 10/2008 Schaefer .................... F24J 2/05
126/657
2010/0199974 A1 8/2010 Plotkin et al.

OTHER PUBLICATIONS

European Examination Report issued in counterpart European Application No. 13 826 214.2 dated Feb. 2, 2017 (six pages).

* cited by examiner

FIG. 3
(DETAILS OF CONNECTION PORTION IN FIG. 2, HORIZONTAL SECTION)

Prior Art

FIG. 8

Prior Art

FIG. 9

Prior Art

FIG. 10

Prior Art

SOLAR COLLECTOR FOR SOLAR HEAT BOILER, AND TOWER-TYPE SOLAR HEAT BOILER EQUIPPED WITH SAME

TECHNICAL FIELD

The present invention relates to a solar collector for a solar heat boiler, which can collect heat from the sun and generate steam by use of the collected heat, and a tower-type solar heat boiler which is equipped with the solar collector.

BACKGROUND ART

Concentration type solar heat plants are roughly classified into independent plants and Hybrid plants. In the independent plants, most heat is provided by solar heat while a part of the heat is backed up by fossil fuel or the like. On the other hand, in the Hybrid plants, most heat is provided by fossil fuel or nuclear fuel while a part of the heat is backed up by solar heat.

In both types of the independent plants and the Hybrid plants, heat from sunlight is collected and used as a heating source, and a solar collector is also used substantially in common. Generally, a trough type light/solar collector (in which a parabolic mirror is provided and a heat transfer pipe is disposed at a focal point where the sunlight is focused), a Fresnel type solar collector (in which a large number of flat mirrors are provided and heat transfer pipes are disposed at focal points where the sunlight is focused) and a tower type solar collector (in which a large number of flat mirrors (hereinafter also referred to as mirrors simply) are placed in a wide region close to the ground surface and a heat transfer panel serving as a solar collector is disposed at a focal point where the sunlight reflected by the mirrors is focused) can be used as the solar collector.

Among them, the trough type solar collector and the Fresnel type solar collector are short in the focal length and low in the degree of concentration of the sunlight (the heat density in a heat collection portion). On the other hand, the tower type solar collector is long in the focal length to be able to use light reflected from a wide region. Thus, the tower type solar collector has characteristic that the degree of concentration of the sunlight (the heat density in a heat collection portion) is high. When the heat density in the solar collector is high, the amount of collected heat per unit heat transfer area is large so that higher-temperature steam can be obtained.

Figure 7:
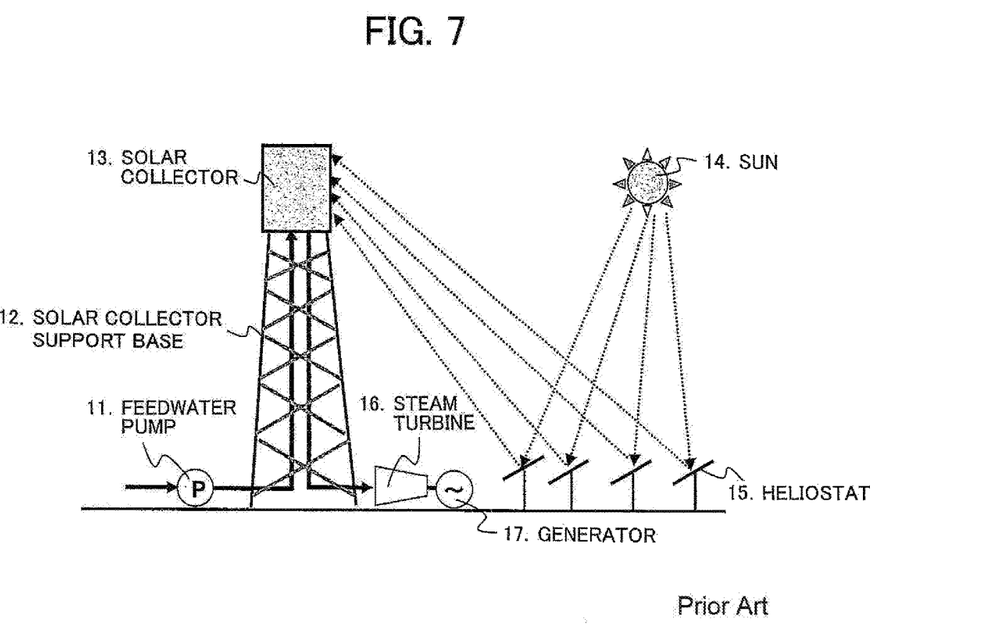
FIG. 7 A view showing a conceptual configuration of a typical prior art tower-type independent solar heat boiler.

Next, an example of a tower type independent plant will be illustrated for explaining a background-art technique. FIG. 7 shows a schematic view of a typical tower type independent plant. By a feedwater pump 11, water is delivered to a solar collector 13 placed on a solar collector supporting base 12. On the other hand, light from the sun 14 is reflected by mirror surfaces of heliostats 15 constituted by mirrors and drive units, and collected onto the solar collector 13. In the solar collector 13, the temperature of the water rises due to the heat of the sun so that steam is generated. The steam generated in the solar collector 13 is delivered to a steam turbine 16. The steam turbine 16 is driven so that a generator 17 can generate electricity.

Figure 8:
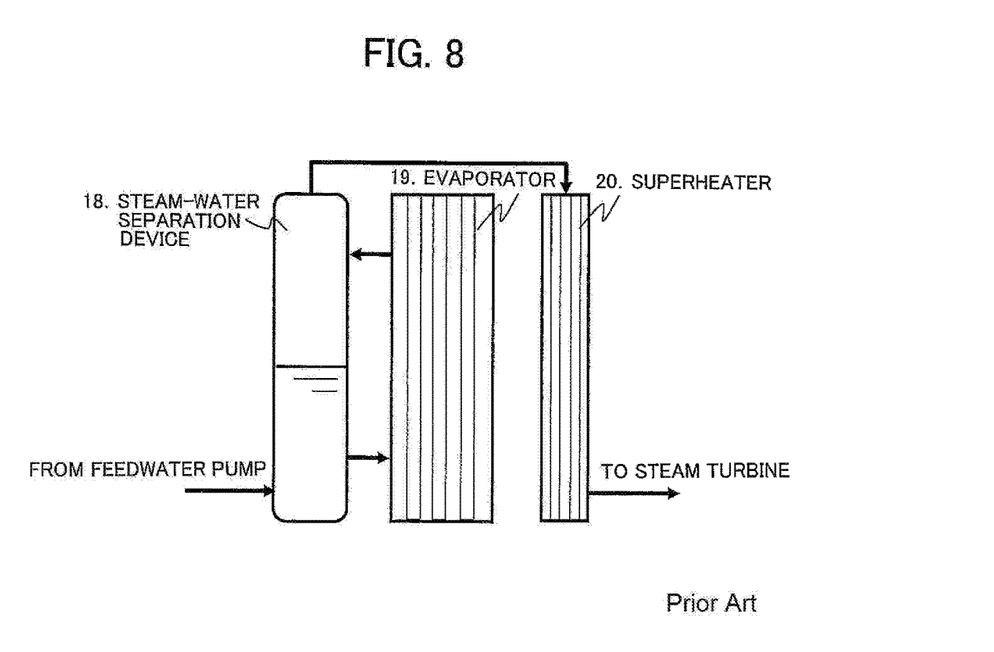
FIG. 8 A view showing the configuration of a solar collector in the solar heat boiler shown in FIG. 7.

As an example of the structure of the solar collector 13, FIG. 8 shows an example of a solar collector including an evaporator 19 and a superheater 20. Water supplied by the feedwater pump 11 (see FIG. 7) once enters a steam-water separation device 18. The water is circulated and heated in the evaporator 19 so as to turn into steam partially, and then enters the steam-water separation device 18 again. In the steam-water separation device 18, the water is separated into saturated steam and saturated water. The saturated steam enters the superheater 20, while the saturated water enters the evaporator 19 again. The saturated steam entering the superheater 20 is heated by solar heat so that superheated steam is generated. The generated superheated steam is delivered to the steam turbine 16 (see FIG. 7).

Figure 9:
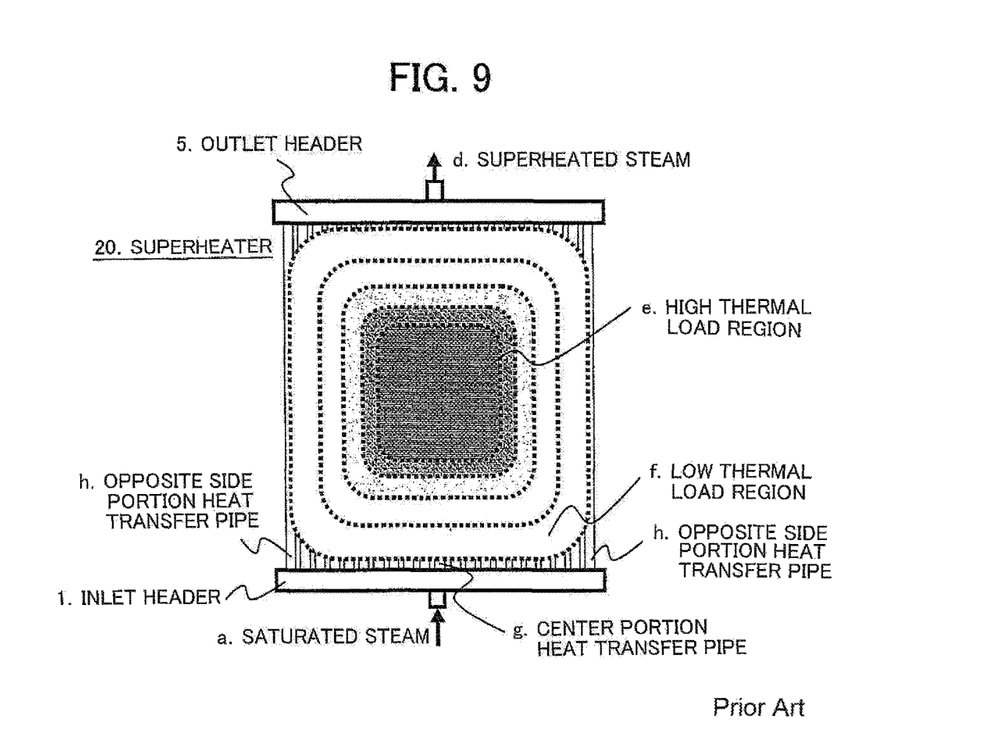
FIG. 9 A view showing a structure of a superheater and a thermal load distribution of the superheater in the solar collector shown in FIG. 8.

FIG. 9 schematically shows the structure of the superheater 20 (heat collection portion) in the aforementioned solar collector 13 and the distribution of a thermal load (unit: $KW/m^2$) in the superheater 20 (heat collection portion). Each broken line connects portions of the same thermal load like a contour line and shows each region of the same thermal load stepwise.

Saturated steam a generated in the evaporator 19 is supplied to the superheater 20 (heat collection portion) through an inlet header 1 and heated by solar heat so as to turn into superheated steam d, which flows out through an outlet header 5. The pattern shape of incident light reflected by each mirror with a fixed shape and reaching a light receiving surface serving as the heat collection portion of the solar collector is changed by the azimuth angle and the elevation angle of each heliostat following the sun in accordance with the positional relation between the mirror and the light receiving surface and the azimuth and the altitude of the sun.

For example, even if a square mirror is used, the pattern of an incident light ray may be changed to be longer horizontally than vertically or longer vertically than horizontally. In addition, the patterns of incident light rays reaching the light receiving surface from a plurality of mirrors having the same shape but placed in different positions are different from one another. Therefore, a distribution may occur in the intensity of incident light obtained by those incident light rays superimposed on one another. That is, a region high in thermal load and a region low in thermal load are generated, as shown in FIG. 9.

On the other hand, a portion where light rays reflected by a plurality of mirrors are superimposed (overlapped) becomes high in temperature. It is therefore undesirable that the reflected light rays which are incident on a portion other than the heat collection portion of the solar collector may thermally damage any member in that portion.

Therefore, during an operation period of the solar heat boiler (solar collector), the region of the light receiving surface of the solar collector (i.e. the width and height of the heat collection portion of the solar collector) is generally set to be larger than the shape of incident light (hereinafter also referred to as whole incident light pattern) in which incident light rays from all the mirrors in use are superimposed, so that the whole incident light pattern can be prevented from protruding from the light receiving surface of the solar collector.

The upper/lower range or distribution of the absolute value of the thermal load of the superheater 20 (heat collection portion) fluctuates depending on the installation conditions (dimensions, shapes, installation region, number, etc.) or the tracking method (control) of the heliostats (mirrors) and depending on the azimuth or altitude of the sun. However, the thermal load is highest in a central portion (high thermal load region e) of the superheater 20 and decreases as it goes more closely to the periphery (low thermal load region f) of the superheater 20.

Figure 10:
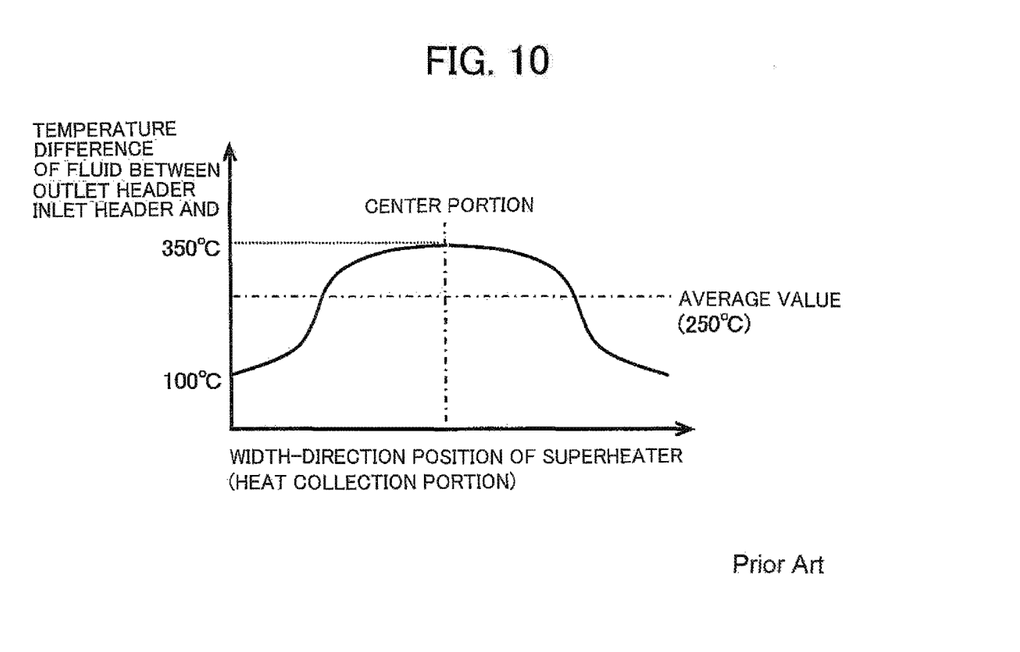
FIG. 10 A graph showing the relation between a width-direction position of the superheater shown in FIG. 9 and a temperature difference of a fluid between an inlet header and an outlet header.

FIG. 10 shows the relation between the width-direction (direction perpendicular to the axis direction of each heat transfer pipe) position of the superheater 20 (heat collection portion) shown in FIG. 9, which position is on the abscissa, and a temperature difference of a fluid between the inlet header 1 and the outlet header 5 in the superheater 20 (heat collection portion), which temperature difference is on the ordinate.

The heat transfer pipe (the reference sign g shown in FIG. 9) in the central portion is located in the high thermal load region e. For example, on the conditions in which a fluid to be heated (saturated steam a) flows into the inlet header 1 and at a pressure of 5 MPa and the fluid (superheated steam d) flows out from the outlet header 5 and at an average temperature of 500° C., the temperature of the fluid reaches about 600° C. at the outlet portion while the temperature of the fluid to be heated (saturated steam a) is a saturation temperature of about 250° C. at the inlet. Thus, the temperature difference of the fluid between the inlet header and the outlet header is about 350° C. On the other hand, the heat transfer pipes (the reference sign h shown in FIG. 9) in the opposite side portions are located in the low thermal load region f. Accordingly, the heating amount is so low that the temperature of the fluid reaches about 350° C. at the outlet portion while the temperature of the fluid to be heated (saturated steam a) is about 250° C. at the inlet. Thus, the temperature difference of the fluid between the inlet header and the outlet header is about 100° C. As a result, the width-direction temperature difference in the outlet header reaches about 250° C. (600° C.-350° C.). In this manner, a large temperature difference arises among width-direction positions of the superheater (heat collection portion).

In addition, for example, Patent Literature 1 discloses a boiler using solar heat, in which a plurality of solar heat light reception panels each having a lower header and an upper header are connected in cascade so that a fluid passing through pipes can be heated sequentially. This Patent Literature 1 also has no particular suggestions about heat reception properties in width-direction positions of the light reception panels.

In addition, Patent Literature 2 discloses an arrangement structure of heat transfer pipes as follows. That is, a lower header is provided in the width direction of a passage through which a heat medium as exhaust gas passes, and the lower header is divided into three portions by two partition plates so that a fluid from an inlet pipe can flow into a division port of a width-direction center portion and the fluid returning from the division port of the center portion via an upper header can flow into division ports on the opposite sides of the center portion. This Patent Literature 2 suggests that an inlet and an outlet are provided in the lower header so that a communication pipe heretofore placed between the upper header and the lower header can be eliminated.

CITATION LIST

Patent Literature

Patent Literature 1: US Patent Application US2010/0199974A1
Patent Literature 2: JP-A-61-252401

SUMMARY OF INVENTION

Technical Problem

However, in the background-art techniques shown in FIG. 7 and FIG. 8, including the aforementioned Patent Literature 1, a very large temperature difference occurs in an array direction of a large number of heat transfer pipes (in a direction perpendicular to the axis direction of each heat transfer pipe or in a width direction of a superheater or a heat collection portion). Therefore, there is a possibility that the amount of thermal expansion may vary in the width direction of the heat transfer pipes and the heat transfer pipes and the headers may be damaged.

On the other hand, the aforementioned Patent Literature 2 discloses a structure in which the lower header connecting one ends of a large number of heat transfer pipes is divided into three portions, a center portion of which is set as the inlet side of a fluid while the other portions on the opposite sides of the center portion are set as the outlet sides of the fluid. However, a source for heating the fluid is exhaust gas passing through a boiler. Differently from collected solar heat, the source is not a heat source which may cause a large temperature difference of the exhaust gas in the width direction of the passage of the exhaust gas. Thus, in Patent Literature 2, the lower header is divided for the purpose of eliminating the communication pipe between the upper header and the lower header.

An object of the invention is to provide a solar collector for a solar heat boiler, which includes such a structure of headers and such formation of a fluid flow in heat transfer pipes connecting the headers, that a deviation between an inlet-outlet temperature difference of the fluid in a width-direction center portion of a heat collection portion (superheater) and an inlet-outlet temperature difference of the fluid in each of width-direction opposite side portions of the heat collection portion (superheater) can be suppressed to be low enough to reduce the amount of width-direction thermal expansion in the heat transfer pipes.

Solution to Problem

In order to solve the foregoing problem, the invention chiefly uses the following configuration.

A solar collector for a solar heat boiler includes: a plurality of heat transfer pipes inside which a fluid to be heated flows; cylindrical headers which are disposed in opposite positions and connected to opposite end portions of the heat transfer pipes respectively; and a planar solar heat collection portion which is formed out of the heat transfer pipes and membrane bars fixing adjacent ones of the heat transfer pipes to each other; wherein: the cylindrical headers include an inlet header into which the fluid to be heated flows, an intermediate header which is disposed in a position opposed to the inlet header with interposition of the heat transfer pipes, and two outlet headers which are provided to extend on opposite end sides of the inlet header and through which the fluid introduced from the intermediate header through the heat transfer pipes can be discharged to the outside; and the planar solar heat collection portion includes a first heat collection subportion which is formed out of a group of the heat transfer pipes connected between the inlet header and the intermediate header and the membrane bars for the group of the heat transfer pipes so as to form a center region of the solar heat collection portion extending in an axis direction of each heat transfer pipe, and second heat collection subportions which are formed out of groups of the heat transfer pipes connected between the intermediate header and the two outlet headers and the membrane bars for the groups of the heat transfer pipes so as to be formed on opposite sides of the first heat collection subportion respectively.

In addition, a tower-type solar heat boiler includes: the aforementioned solar collector for a solar heat boiler; an evaporator which heats water supplied thereto; a steam-water separator which separates a water-steam two-phase fluid generated in the evaporator into saturated steam and water; and heliostats which track light of the sun and concentrate the light on the solar heat collection portion of the solar collector for a solar heat boiler; wherein: the saturated steam separated in the steam-water separator is made to flow into the inlet header as the fluid to be heated in the solar collector for a solar heat boiler, so that the saturated steam can be superheated.

Advantageous Effects of Invention

According to the invention, a deviation between an inlet-outlet temperature difference of a first superheater part and an inlet-outlet temperature difference of each of second superheater parts can be reduced so that a difference in thermal expansion between the first superheater part and the second superheater part can be reduced. It is therefore possible to avoid damage on the solar collector for a solar heat boiler.

In addition, when the solar collector according to the invention is used in a tower-type solar heat boiler, the deviation of an inlet-outlet temperature difference of a fluid in the width direction of the superheater can be reduced even if the rate of saturated steam flowing into the superheater fluctuates or the amount of solar radiation fluctuates. In addition, only the superheater can be placed in an upper portion of a tower. Accordingly, it is possible to reduce the total equipment cost of the solar heat boiler.

DESCRIPTION OF EMBODIMENT

Figure 1:
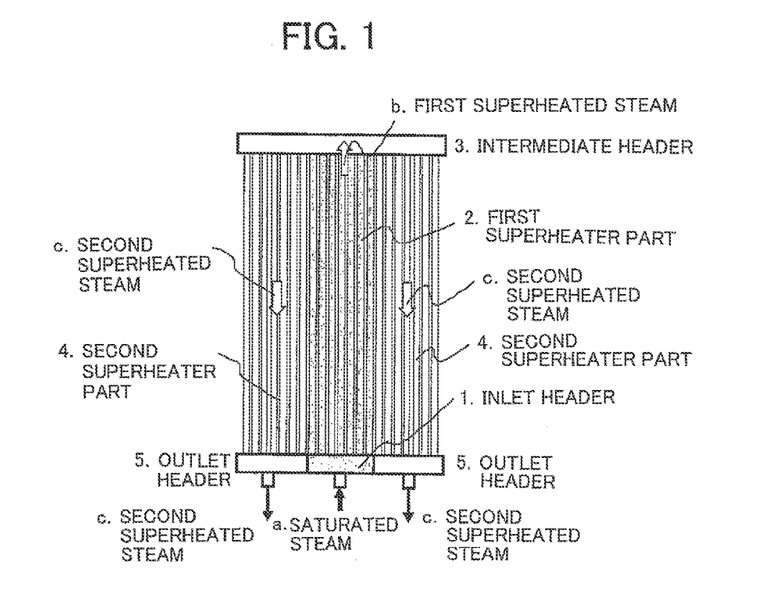
FIG. 1 A configuration view showing a structure of headers and formation of a fluid flow in a solar collector for a solar heat boiler according to an embodiment of the invention.
Figure 2:
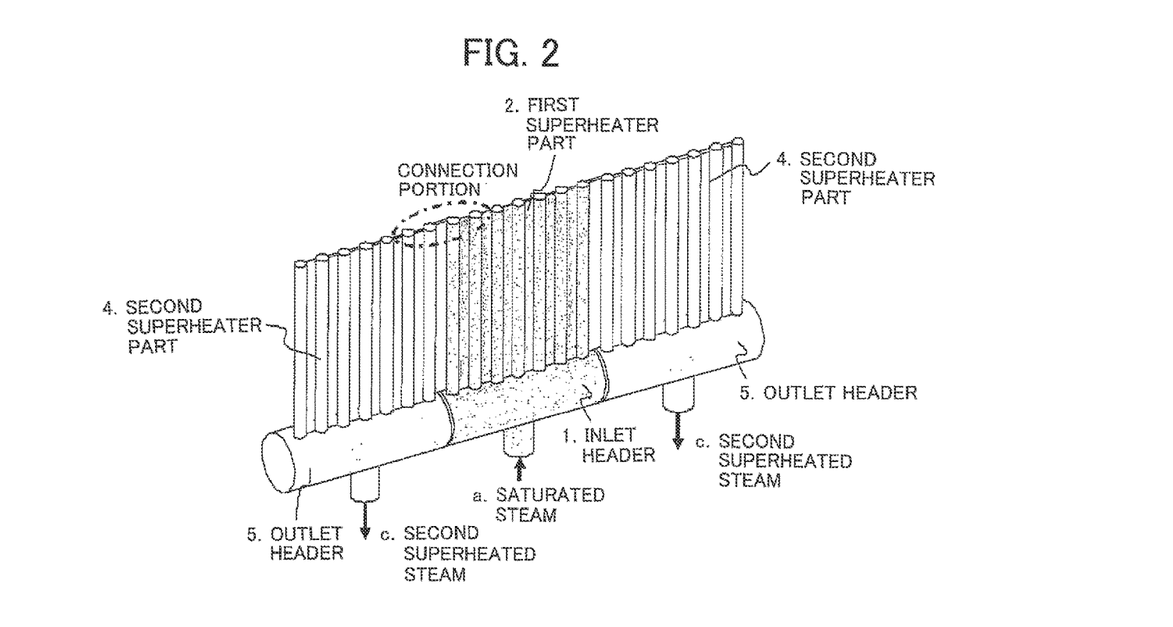
FIG. 2 A view showing details of the headers and superheater parts of a superheater in the configuration shown in FIG. 1.
Figure 3:
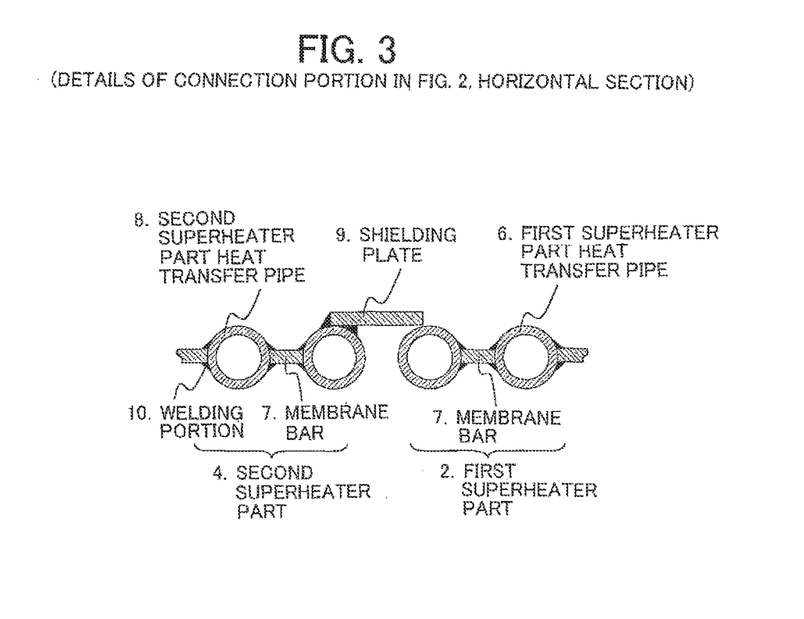
FIG. 3 A sectional view showing details of a connection portion between the superheater parts shown in FIG. 2.

The configuration and functions of a solar collector for a solar heat boiler according to an embodiment of the invention will be described below in detail with reference to FIG. 1 to FIG. 3. FIG. 1 is a configuration view showing a structure of headers and formation of a fluid flow in the solar collector for a solar heat boiler according to the embodiment of the invention. FIG. 2 is a view showing details of the headers and superheater parts of a superheater in the configuration shown in FIG. 1. FIG. 3 is a sectional view showing details of a connection portion between the superheater parts shown in FIG. 2.

In FIG. 1, the superheater of the tower-type solar heat boiler according to the embodiment includes an inlet header 1, a first superheater part 2, an intermediate header 3, second superheater parts 4 and outlet headers 5. Saturated steam a flows into the inlet header 1. The first superheater part 2 includes a plurality of heat transfer pipes, in which the saturated steam a flowing into the inlet header 1 is heated by solar heat so that first superheated steam b is generated. The first superheated steam b generated in the first superheater part 2 is collected and distributed by the intermediate header 3. Each second superheater part 4 includes a plurality of heat transfer pipes, in which the first superheated steam b flowing out from the intermediate header 3 is heated by solar heat so that second superheated steam c is generated. The second superheated steam c generated in the second superheater parts 4 flows out from the outlet headers 5.

Here, configuration is made in such a manner that the second superheater parts 4 are disposed on the opposite sides of the first superheater part 2 in the width direction of the heat collection portion (the left/right direction of the sheet of FIG. 1), so that superheated steam in the heat transfer pipes constituting the first superheater part 2 can move in an opposite direction to the moving direction of superheated steam in the heat transfer pipes constituting the second superheater parts 4. In addition, in the embodiment, configuration is made in such a manner that the ratio between the area of the first superheater part 2 and the area of the second superheater parts 4 is set to be about 1:2, i.e. the number of heat transfer pipes in the first superheater part 2 is substantially equal to the number of heat transfer pipes in each second superheater part 4.

FIG. 2 shows a structure around the inlet header 1 and the outlet headers 5. The inlet header 1 and the outlet headers 5 are partitioned from one another, for example, by partition plates. Thus, the inlet header 1 and the outlet headers 5 are so independent that a fluid cannot travel from one header to another. The first superheater part 2 and the second superheater parts 4 are connected to the inlet header 1 and the outlet headers 5 respectively.

The horizontally sectional structure of a connection portion (a region surrounded by the one-dot chain line in FIG. 2) between the first superheater part 2 and each second superheater part 4 will be described with reference to FIG. 3. The first superheater part 2 includes first superheater part heat transfer pipes 6 and membrane bars 7. Likewise, the second superheater part 4 includes second superheater part heat transfer pipes 8 and membrane bars 7. The heat transfer pipes and the membrane bars constituting each superheater part are connected by welding. However, the connection portion between the first superheater part and the second superheater part has a structure in which a first superheater part heat transfer pipe 6 and a second superheater part heat transfer pipe 8 are not connected by welding through the membrane bar 7 but a shielding plate 9 is connected to the second superheater part heat transfer pipe 8 side by welding.

Each membrane bar 7 is a member which is used for connecting two heat transfer pipes adjacent to each other. The membrane bar 7 is attached to the heat transfer pipes by welding. On the other hand, the shielding plate 9 attached to one of heat transfer pipes by welding is not welded (fixed) to the other heat transfer pipe but is simply in contact therewith. As a result, even when there is a difference in expansion between the first superheater part 2 and the second superheater part 4, the shielding plate 9 can be prevented from being damaged because the first superheater part 2 and the second superheater part 4 are not bound by each other.

Normally, on the conditions that a thermal load is the highest during the operating period of the solar heat boiler (solar collector) (for example, around noon in summer if the location is in the Northern Hemisphere), a region where incident light rays from all mirrors in use are superimposed occupies about $1/3$ to $1/2$ of the entire width and the entire height of the heat collection portion both in the width direction and the height direction. In the embodiment, the size of the solar heat boiler (solar collector) and the size of mirrors are set so that such a region occupies about $1/3$ of the entire width and the entire height.

Figure 4:
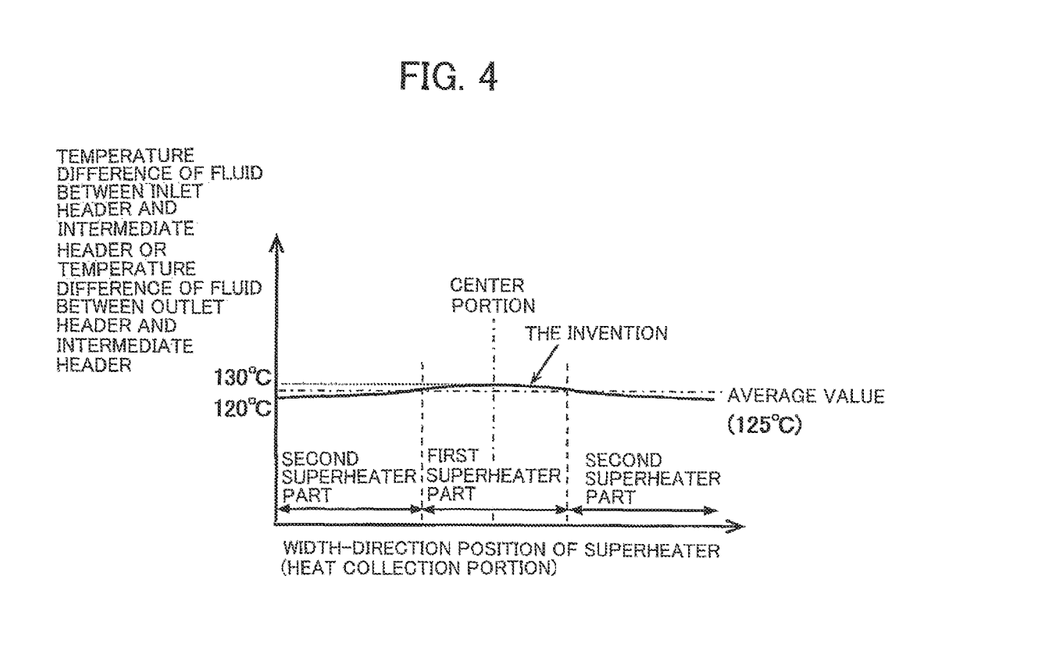
FIG. 4 A graph showing the relation between a width-direction position of the superheater and a temperature difference of a fluid between an inlet header and an intermediate header or a temperature difference of the fluid between the intermediate header and each outlet header according to the embodiment.

According to the embodiment, the first superheater part 2 in which low-temperature saturated steam is circulated is disposed in the region where the incident light rays from all the mirrors in use are superimposed while the second superheater parts 4 in which high-temperature superheated steam is circulated are disposed in peripheral low thermal load regions. Further, the areas (substantially planar areas each formed out of the heat transfer pipes and the membrane bars) of the first superheater part 2 and the second superheater parts 4 are set in a ratio of about 1:2. Thus, the temperature difference between the inlet header 1 and the intermediate header 3 and the temperature difference between each outlet header 5 and the intermediate header 3 can be equalized as shown in FIG. 4.

That is, on the conditions in which a fluid to be heated (saturated steam a) flows into the inlet header 1 and at a pressure of 5 MPa and the fluid (second superheated steam c) flows out from each outlet header 5 and at an average temperature of 500° C., the temperature of the fluid (first superheated steam b) in the intermediate header 3 is about 380° C. while the temperature of the fluid to be heated (saturated steam a) is a saturation temperature of about 250° C. at the inlet. Thus, the temperature difference of the fluid between the inlet header 1 and the intermediate header 3 is about 130° C. On the other hand, the temperature of the fluid (first superheated steam b) flowing from the intermediate header 3 into each second superheater part 4 is about 380° C. The fluid heated by the second superheater part 4 reaches about 500° C. in the outlet header 5. Thus, the temperature difference of the fluid between the outlet header 5 and the intermediate header 3 is about 120° C. In this manner, the temperature difference of the fluid in the width direction of the superheater (heat collection portion) is about 10° C. (130° C.-120° C.). The temperature difference can be reduced conspicuously in comparison with about 250° C. in the background-art example (see FIG. 10).

Here, due to the variation of the amount of solar radiation or the like, the temperature difference between the inlet header 1 and the intermediate header 3 may not always coincide with the temperature difference between each outlet header 5 and the intermediate header 3. Therefore, the structure shown in FIG. 2 is used to avoid damage on the headers caused by a difference in thermal expansion. The structure shown in FIG. 2 is not to improve the large temperature difference among the headers but to avoid damage on the headers caused by a difference in thermal expansion between the first superheater part and each second superheater part.

In addition, the intermediate header 3 is of an integral type in the embodiment. However, there may be used a mode (divided type) in which the intermediate header 3 is divided into portions in accordance with the first superheater part 2 and the second superheater parts 4 and the divided portions of the intermediate header 3 are coupled through communication pipes or the like. The divided type has a structure in which the first superheater part 2 and the second superheater parts 4 are perfectly independent of one another. The degree of freedom in transportation or installation indeed increases, but the superheater parts must be coupled through the communication pipes. Thus, the equipment (material) cost increases.

Here, in the embodiment, the first superheater part heat transfer pipes 6 and the second superheater part heat transfer pipes 8 have the same pipe specifications (outer diameter, thickness and material) and the same interval (pipe pitch) between adjacent ones of the pipes. However, it is necessary to select most suitable material and thickness for each pipe in accordance with the temperature or pressure of steam flowing into the pipe. For example, when the temperature of the second superheated steam c exceeds 600° C., carbon steel may be used as the material of the first superheater part heat transfer pipes 6 and high chrome steel or stainless steel may be used as the material of the second superheater part heat transfer pipes 8. In this manner, increase in cost can be suppressed.

Figure 5:
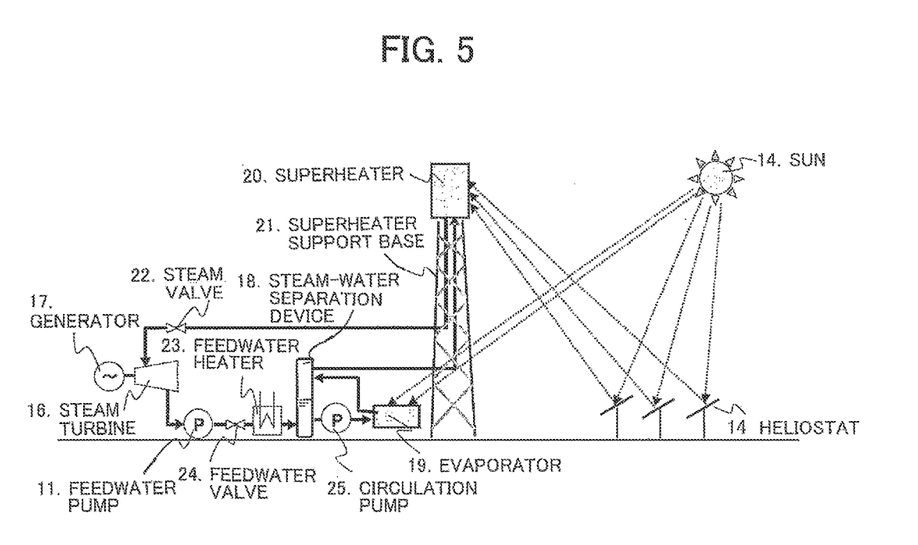
FIG. 5 A view showing an arrangement structure including an evaporator and a superheater in a tower-type solar heat boiler according to an embodiment of the invention.
Figure 6:
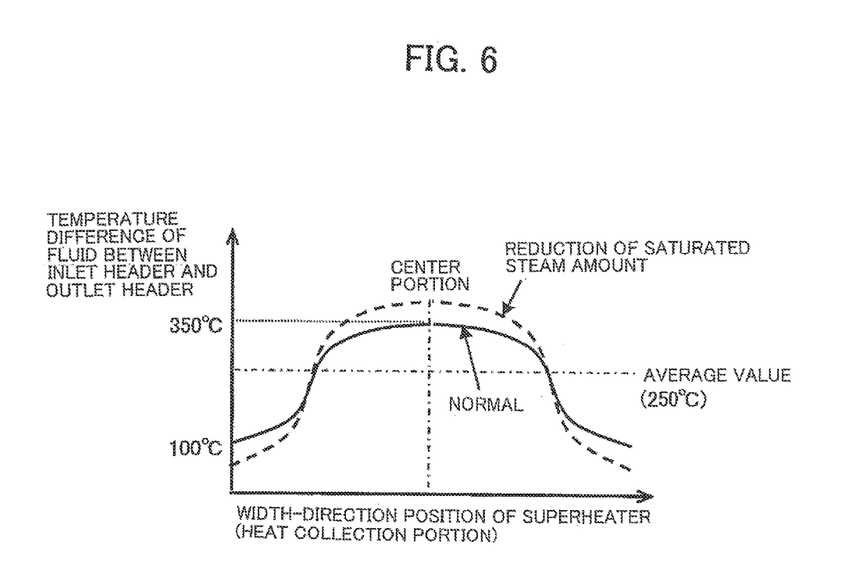
FIG. 6 A graph showing the relation between the amount of saturated steam flowing into a superheater and a temperature difference of a fluid between an inlet header and an outlet header.

Next, a tower-type solar heat boiler according to an embodiment of the invention will be described below with reference to FIG. 5 and FIG. 6. FIG. 5 is a view showing an arrangement structure including an evaporator and a superheater in the tower-type solar heat boiler according to the embodiment of the invention. FIG. 6 is a graph showing the relation between the amount of saturated steam flowing into the superheater and a temperature difference of a fluid between an inlet header and an outlet header.

In the tower-type solar heat boiler according to the embodiment, as shown in FIG. 5, water supplied from a feedwater pump 11 and passing through a feedwater valve 24 is delivered to a feedwater heater 23. The water heated in the feedwater heater 23 is introduced into an evaporator 19 through a steam-water separation device 18 and a circulation pump 25. In the evaporator 19, the supplied water is heated by heat from the sun 14.

A water-steam two-phase fluid generated in the evaporator 19 is separated into saturated water and saturated steam in the steam-water separation device 18. The separated steam is delivered to the superheater 20 placed on a superheater support base 21. The steam introduced into the superheater 20 is further heated by solar heat reflected by heliostats 15 and introduced into the superheater 20. A mechanism is made so that the superheated steam generated by the superheater 20 can rotate a steam turbine 16 so as to generate electric power in a generator 17 due to the rotation of the steam turbine 16. Here, in order to adjust the rate of steam supplied to the steam turbine 16, the feedwater valve 24 is placed between the feedwater pump 11 and the feedwater heater 23, and a steam valve 22 is placed between the superheater 20 and the steam turbine 16.

In the embodiment, a large amount of water is contained in the evaporator 19 and the steam-water separation device 18 so that the devices as a whole are heavy. For this reason, the evaporator 19 and the steam-water separation device 18 are placed on the ground surface or near the ground surface by use of a low base which is, for example, 1 to 2 meters high. Since the evaporator 19 and the steam-water separation device 18 are placed on or near the ground surface in this manner, water does not have to be pumped up to a high place, which is, for example, 30 to 100 meters high, as in the background-art tower-type solar heat plant shown in FIG. 7. Thus, a feedwater pump which is low in pumping-up capacity and inexpensive can be used as the feedwater pump 11 so that the total equipment cost of the tower-type solar heat boiler can be reduced.

On the other hand, the superheater 20 is placed at a high place, which is 10 meters high or higher (for example, 30 to 100 meters high) from the ground surface, so that light rays from the heliostats 15 can be collected with high light density. Since a fluid flowing inside the superheater 20 is only steam, the device is much lighter in weight and smaller in size than the background-art solar collector 13 including the evaporator 19, the superheater 20 and the steam-water separation device 18 as shown in FIG. 7 and FIG. 8. Incidentally, the ratio between the amount of heat collected by the evaporator 19 and the amount of heat collected by the superheater 20 is about 9:1 to 7:3. The amount of heat collected by the superheater 20 is much smaller than that collected by the evaporator 19.

In the concentration type solar heat boiler according to the embodiment, no heat storage device, no heat storage medium such as molten salt, and no supplementary superheating device using fossil fuel are used, but saturated steam separated by the steam-water separation device 18 is supplied directly to the superheater 20. Accordingly, the rate of saturated steam flowing into the superheater 20 changes due to the influence of the variation of the amount of solar radiation. Particularly when the rate of saturated steam decreases, a temperature difference increases in a center portion where a thermal load is high while a temperature difference decreases in each of opposite side portions where a thermal load is low. As a result, a temperature difference in the width direction is made larger than normal.

To solve the aforementioned problem of the larger temperature difference in the width direction, the solar collector shown in FIG. 1 may be used. Even when the rate of saturated steam flowing into the superheater 20 changes due to the variation of the amount of solar radiation, the deviation of an inlet-outlet temperature difference of a fluid in the width direction of the superheater can be reduced on a large scale in comparison with that in the background art, so that the difference of thermal expansion among the superheater parts in the width direction of the superheater can be reduced.

REFERENCE SIGNS LIST

1 inlet header
2 first superheater part
3 intermediate header
4 second superheater part
5 outlet header
6 first superheater part heat transfer pipe
7 membrane bar
8 second superheater part heat transfer pipe
9 shielding plate
10 welding portion
11 feedwater pump
12 solar collector support base
13 solar collector
14 sun
15 heliostat
16 steam turbine
17 generator
18 steam-water separation device
19 evaporator
20 superheater
21 superheater support base
22 steam valve
23 feedwater heater
24 feedwater valve
25 circulation pump
a saturated steam
b first superheated steam
c second superheated steam
d superheated steam
e high thermal load region
f low thermal load region
g center portion heat transfer pipe
h opposite side portion heat transfer pipe

The invention claimed is:

1. A solar collector for a solar heat boiler, comprising: a plurality of heat transfer pipes inside which a fluid to be heated flows; cylindrical headers which are disposed in opposite positions and connected to opposite end portions of the heat transfer pipes respectively; and a planar solar heat collection portion which is formed out of the heat transfer pipes and membrane bars fixing adjacent ones of the heat transfer pipes to each other; wherein:
   the cylindrical headers include an inlet header into which the fluid to be heated flows, an intermediate header which is disposed in a position opposed to the inlet header with interposition of the heat transfer pipes, and two outlet headers which are provided to extend on opposite end sides of the inlet header and through which the fluid introduced from the intermediate header through the heat transfer pipes can be discharged to the outside; and
   the planar solar heat collection portion includes a first heat collection subportion which is formed out of a group of the heat transfer pipes connected between the inlet header and the intermediate header and the membrane bars for the group of the heat transfer pipes so as to form a center region of the solar heat collection portion extending in an axis direction of each heat transfer pipe, and second heat collection subportions which are formed out of groups of the heat transfer pipes connected between the intermediate header and the two outlet headers and the membrane bars for the groups of the heat transfer pipes so as to be formed on opposite sides of the first heat collection subportion respectively.

2. A solar collector for a solar heat boiler according to claim 1, wherein:
   a planar area ratio between the first heat collection subportion and the second heat collection subportions is set at about 1 to 2 so as to reduce a deviation between a temperature difference of the fluid between the intermediate header and the inlet header in the center portion of the first heat collection subportion and a temperature difference of the fluid between each of the outlet headers and the intermediate header in outermost portions of the second heat collection subportions.

3. A tower-type solar heat boiler comprising:
   a solar collector for a solar heat boiler having
      a plurality of heat transfer pipes inside which a fluid to be heated flows,
      cylindrical headers which are disposed in opposite positions and connected to opposite end portions of the heat transfer pipes respectively, and a planar solar heat collection portion which is formed out of the heat transfer pipes and membrane bars fixing adjacent ones of the heat transfer pipes to each other, wherein in the solar collector
the cylindrical headers include an inlet header into which the fluid to be heated flows, an intermediate header which is disposed in a position opposed to the inlet header with interposition of the heat transfer pipes, and two outlet headers which are provided to extend on opposite end sides of the inlet header and through which the fluid introduced from the intermediate header through the heat transfer pipes can be discharged to the outside, and the planar solar heat collection portion includes a first heat collection subportion which is formed out of a group of the heat transfer pipes connected between the inlet header and the intermediate header and the membrane bars for the group of the heat transfer pipes so as to form a center region of the solar heat collection portion extending in an axis direction of each heat transfer pipe, and second heat collection subportions which are formed out of groups of the heat transfer pipes connected between the intermediate header and the two outlet headers and the membrane bars for the groups of the heat transfer pipes so as to be formed on opposite sides of the first heat collection subportion respectively;

an evaporator which heats water supplied thereto; a steam-water separator which separates a water-steam two-phase fluid generated in the evaporator into saturated steam and water; and heliostats which track light of the sun and concentrate the light on the solar heat collection portion of the solar collector for a solar heat boiler;

wherein the saturated steam separated in the steam-water separator is made to flow into the inlet header as the fluid to be heated in the solar collector for a solar heat boiler, so that the saturated steam can be superheated.

4. The tower-type solar heat boiler according to claim 3, wherein:
the solar collector for the solar heat boiler is placed in an upper portion of a tower, and the evaporator and the steam-water separator are placed on or near a ground surface.

5. A tower-type solar heat boiler comprising:
a solar collector for a solar heat boiler having
a plurality of heat transfer pipes inside which a fluid to be heated flows,
cylindrical headers which are disposed in opposite positions and connected to opposite end portions of the heat transfer pipes respectively, and
a planar solar heat collection portion which is formed out of the heat transfer pipes and membrane bars fixing adjacent ones of the heat transfer pipes to each other, wherein in the solar collector
the cylindrical headers include an inlet header into which the fluid to be heated flows, an intermediate header which is disposed in a position opposed to the inlet header with interposition of the heat transfer pipes, and two outlet headers which are provided to extend on opposite end sides of the inlet header and through which the fluid introduced from the intermediate header through the heat transfer pipes can be discharged to the outside, and the planar solar heat collection portion includes a first heat collection subportion which is formed out of a group of the heat transfer pipes connected between the inlet header and the intermediate header and the membrane bars for the group of the heat transfer pipes so as to form a center region of the solar heat collection portion extending in an axis direction of each heat transfer pipe, and second heat collection subportions which are formed out of groups of the heat transfer pipes connected between the intermediate header and the two outlet headers and the membrane bars for the groups of the heat transfer pipes so as to be formed on opposite sides of the first heat collection subportion respectively;

an evaporator which heats water supplied thereto; a steam-water separator which separates a water-steam two-phase fluid generated in the evaporator into saturated steam and water; and heliostats which track light of the sun and concentrate the light on the solar heat collection portion of the solar collector for a solar heat boiler; wherein:

the saturated steam separated in the steam-water separator is made to flow into the inlet header as the fluid to be heated in the solar collector for a solar heat boiler, so that the saturated steam can be superheated.

* * * * *